United States Patent
Takayama et al.

(10) Patent No.: US 7,167,263 B2
(45) Date of Patent: Jan. 23, 2007

(54) MULTIFUNCTION PERIPHERAL APPARATUS, EXTERNAL CONTROLLER FOR THE SAME, AND THEIR CONTROL METHOD

(75) Inventors: Makoto Takayama, Kanagawa (JP); Hidenori Ozaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 768 days.

(21) Appl. No.: 10/176,057

(22) Filed: Jun. 21, 2002

(65) Prior Publication Data

US 2003/0002076 A1   Jan. 2, 2003

(30) Foreign Application Priority Data

Jun. 27, 2001  (JP)  .............................. 2001-195394
May 9, 2002   (JP)  .............................. 2002-134695

(51) Int. Cl.
*G06K 9/36*   (2006.01)
*G06K 6/46*   (2006.01)

(52) U.S. Cl. ..................... 358/1.15; 382/232; 382/233; 382/239; 382/284; 382/305

(58) Field of Classification Search ................ 382/232, 382/233, 239, 284, 305; 358/1.15
See application file for complete search history.

(56) References Cited

U.S. PATENT DOCUMENTS 6,330,363 B1 * 12/2001 Accad .......................... 382/232
6,721,071 B1 *  4/2004 Maruyama .................. 358/440
6,952,279 B1 * 10/2005 Iida ............................ 358/1.15

* cited by examiner

*Primary Examiner*—Joseph R. Pokrzywa
*Assistant Examiner*—Vu B. Hang
(74) *Attorney, Agent, or Firm*—Fitzpatrick, Cella, Harper & Scinto

(57) ABSTRACT

In an external print controller added to an MFP, bit map data obtained by analyzing and developing received PDL data is once compressed and, subsequently, transferred via a PCI bus. In the compressed bit map data, the data in a compressed state is stored onto an HD in the MFP as it is. The compressed bit map data is read out from the HD, decompressed, and sent to a printer unit.

4 Claims, 9 Drawing Sheets

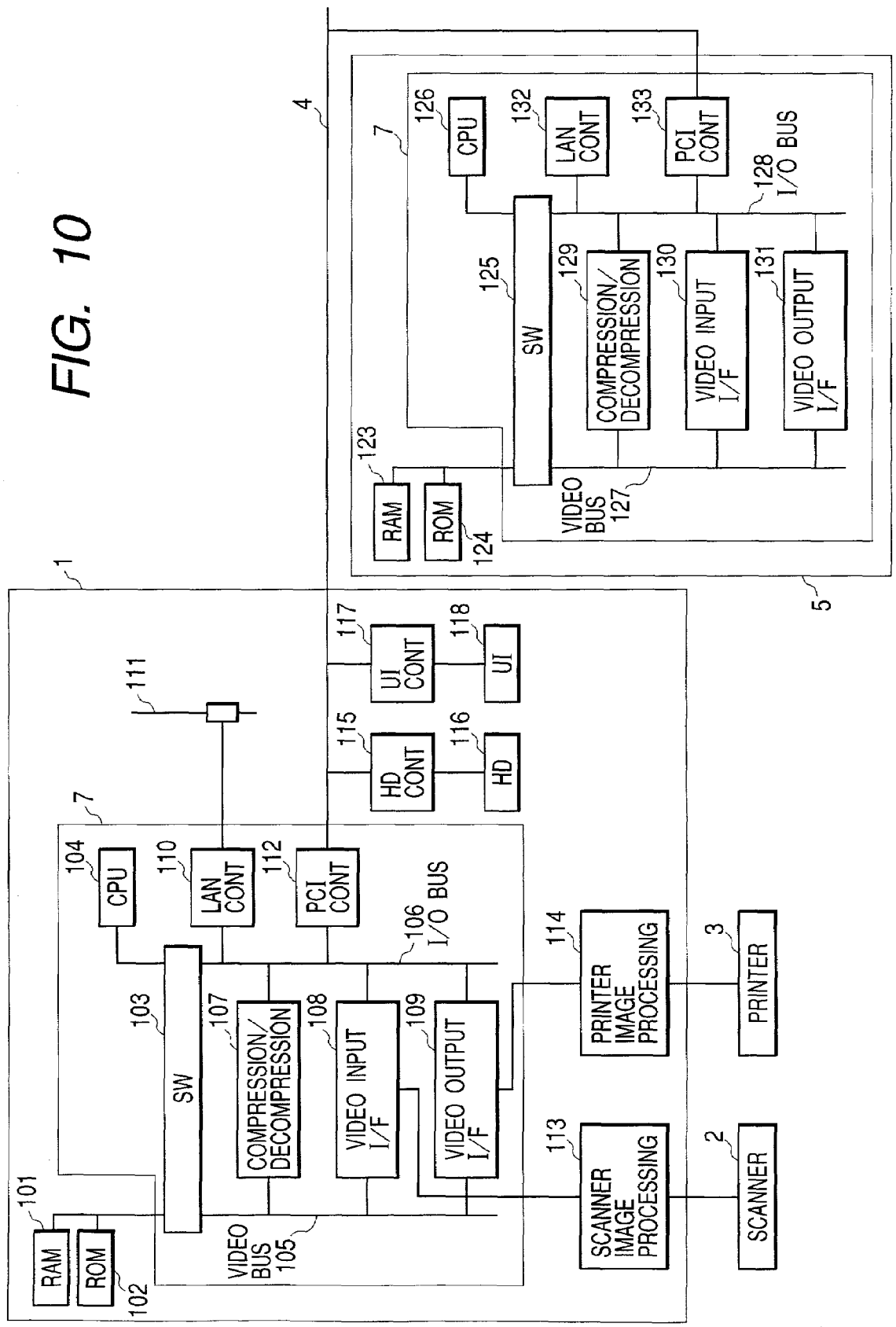

MULTIFUNCTION PERIPHERAL APPARATUS, EXTERNAL CONTROLLER FOR THE SAME, AND THEIR CONTROL METHOD

BACKGROUND OF THE INVENTION

1. Field of the Invention

The invention relates to a multifunction peripheral apparatus, an external controller for such an apparatus, and their control method. More particularly, the invention relates to a multifunction peripheral apparatus (hereinafter, referred to as an MFP) having a copy function, a printer function, a scanner function, and the like.

2. Related Background Art

FIG. 2 shows a conventional example in a technical field to which the invention belongs.

Reference numeral 1 denotes an MFP controller; 2 a scanner; and 3 a printer. The MFP having the scanner function, printer function, copy function, and the like is constructed by those component elements.

In the case where processing ability of a PDL print is not enough if only the MFP controller 1 is used, a PDL accelerator 6 is connected to the outside via a PCI bus 4. A PDL is analyzed by the external PDL accelerator and developed into bit map data. The developed bit map data is returned to the MFP controller 1, thereby realizing the high-speed PDL print.

FIGS. 3, 4, 5, and 6 show details of a conventional example of a B/W MFP.

First, a processing flow for an electronic sorter of the copy in the conventional example will be explained with reference to FIG. 4.

When the copying operation is executed in a UI (user interface unit) 118, a copy job is sent to a CPU 104 via a UIcont 117, the PCI bus 4, a PCIcont 112, an I/O bus 106, and a bus SW (bus switch) 103 (S401).

An instruction for scanning is sent from the CPU 104 to the scanner 2 via the bus SW 103, I/O bus 106, a video input I/F 108, and a scanner image processing unit 113.

Multivalue image data read out from an original by the scanner 2 is sent to the scanner image processing unit 113, converted into a binary image, and stored into a RAM 101 via the video input I/F 108, a video bus 105, and the bus SW 103 (S402). The scan image stored in the RAM 101 is compressed by a compression/decompression unit 107 via the bus SW 103 and video bus 105 and stored into the RAM 101 via the video bus 105 and bus SW 103 (S403).

The compression scan image data stored in the RAM 101 is stored onto an HD 116 via the bus SW 103, I/O bus 106, PCIcont 112, PCI bus 4, and HDcont 115 (S404). The compression scan image data stored onto the HD 116 is stored into the RAM 101 via the HDcont 115, PCI bus 4, PCIcont 112, I/O bus 106, and bus SW 103 (S405).

The compression scan image data which has been read out from the HD 116 and stored in the RAM 101 is decompressed by the compression/decompression unit 107 via the bus SW 103 and video bus 105 and stored into the RAM 101 via the video bus 105 and bus SW 103 (S406). The video data which has been decompressed by the compression/decompression unit 107 and stored in the RAM 101 is printed by the printer 3 via the bus SW 103, I/O bus 106, a video output I/F 109, and a printer image processing unit 114 (S407).

A flow for a network PDL print will now be described with reference to FIG. 5. When the printing operation is executed by a PC (not shown) connected to a network 111 (S501), PDL print data is stored into the RAM 101 via the network 111, an LANcont 110, the I/O bus 106, and bus SW 103. The data stored in the RAM 101 is successively stored onto the HD 116 via the bus SW 103, I/O bus 106, PCIcont 112, PCI bus 4, and HDcont 115 (S502).

The PDL data stored onto the HD 116 is fetched into the RAM 101 via the HDcont 115, PCI bus 4, PCIcont 112, I/O bus 106, and bus SW 103, developed into PDL codes by a process of the CPU 104, and fetched into the RAM 101.

If the apparatus has the external PDL accelerator, the PDL codes in the RAM 101 are simultaneously transferred to a RAM 121 via the bus SW 103, I/O bus 106, PCIcont 112, PCI bus 4, and a PCIcont 119 of the PDL accelerator 6 (S503).

In the PDL accelerator 6, the PDL codes in the RAM 121 are developed into bit map data by a CPU 120 and stored into the RAM 121 (S504). The bit map data stored in the RAM 121 is transferred to the RAM 101 via the PCIcont 119, PCI bus 4, PCIcont 112, I/O bus 106, and bus SW 103 (S505).

The bit map data in the RAM 101 is compressed by the compression/decompression unit 107 via the bus SW 103 and video bus 105 and stored into the RAM 101 via the video bus 105 and bus SW 103 (S506). The compression bit map data stored in the RAM 101 is stored onto the HD 116 via the bus SW 103, I/O bus 106, PCIcont 112, PCI bus 4, and HDcont 115 (S507). The compression bit map data stored onto the HD 116 is stored into the RAM 101 via the HDcont 115, PCI bus 4, PCIcont 112, I/O bus 106, and bus SW 103 (S508). The compression bit map data which has been read out from the HD 116 and stored in the RAM 101 is decompressed by the compression/decompression unit 107 via the bus SW 103 and video bus 105 and stored into the RAM 101 via the video bus 105 and bus SW 103 (S509).

The bit map data which has been decompressed by the compression/decompression unit 107 and stored in the RAM 101 is printed by the printer 3 via the bus SW 103, I/O bus 106, video output I/F 109, and printer image processing unit 114 (S510).

FIG. 6 shows a timing chart for the electronic sort and copy and the PDL print. In the diagram, "scan" shows a manner in which data of "Copy 1" and "Copy n" is stored into the RAM 101 at repetitive timing of Ts. "Compress and write onto HD" shows a processing time which is necessary from the start of the compression of the scan data after completion of the storage of the data of "Copy 1" and "Copy n" into the RAM 101 until the completion of the writing of the data onto the HD 116. "Read out HD and decompress" shows a time which is necessary from the start of reading of the data from the HD 116 until the data which was read out and compressed is decompressed and completely developed into the RAM 101. "Print" shows a period of time during which the data developed on the RAM 101 is outputted to the printer.

"Transfer PDL data" shows a period of time during which the bit map data obtained by analyzing and developing the PDL data is transferred from the PDL accelerator 6 to the MFP controller. "Compress PDL data and write onto HD" shows a time which is necessary until the MFP controller compresses the transferred bit map data and writes it onto the HD. In this instance, each of the foregoing items excluding "scan" and "print" denotes a process which is executed via the PCI bus 4, I/O bus 106, and the like in FIG. 3. FIG. 6, therefore, shows a case where "transfer PDL data", that is, the data transfer from the PDL accelerator 6 of the bit map data of an amount that is much larger than that of the PDL data to the MFP controller 1 is started at the timing of completion of the process of "Read out HD and decompress".

As shown in FIG. 6, in case of only the electronic sort and copy, the process for compressing the scan image, the process for storing the data onto the HD, the process for reading out the data from the HD, and the decompressing process can be sequentially executed for a scanning period of one page, thereby realizing the electronic sorting and copying processes without loss of time.

As shown in FIG. 6, however, if the execution of the PDL print is controlled during the electronic sort and copy, that is, if two processes compete, the total time necessary for the processes of "compress and write onto HD", "read out HD and decompress", "transfer PDL data", and "compress PDL data and write onto HD" does not lie within a scanning period of time of one page. In the example shown in FIG. 6, such a total time is equal to (Ts+α) as compared with a scanning period Ts. This is because the amount of analyzed and developed PDL data, that is, the amount of bit map data is very large, so that it takes a long time for the data transfer.

This means that during the electronic sort and copy, the operations such that after completion of the reception of the data obtained by developing the PDL, the data is compressed and immediately stored onto the HD cannot be executed. In this case, after completion of the electronic sort and copy, when the data obtained by developing the PDL is compressed and stored onto the HD, or in the case where the electronic sort and copy processes are preferentially executed, a processing speed of the PDL print deteriorates as compared with that in case of executing a single process.

If there is a relation of the processing times between the electronic sort and copy and the PDL print as shown in FIG. 6 and the data to be PDL-printed is data of a heavy process, there is a case where it takes time to print the first page of the PDL or a case where the periodic print output is interrupted halfway. On the user's side, there is a problem such that the total time that is required for printing increases, so that loss is caused on business.

SUMMARY OF THE INVENTION

The invention is made in consideration of the above problems and it is an object of the invention to provide a multifunction peripheral apparatus, an external controller for such an apparatus, and their control method, in which in an MFP having an external print controller provided for efficiently executing a process of a PDL print at a high speed even during electronic sort and copy, that is, for the purpose of executing a high speed process of the PDL print, the PDL print can be executed at a high speed even during the electronic sort and copy.

To accomplish the above object, according to the invention, there is provided a multifunction peripheral apparatus comprising: a scanner unit; a printer unit; and a main controller which is connected to the scanner unit and the printer unit and executes various processes including signal processes in a scanner function, a printer function, a copy function, and the like, wherein the multifunction peripheral apparatus further comprises an external print controller which is connected to the main controller via a bus and executes the signal process in the printer function, the external print controller compresses bit map image data developed in the internal signal processes and transfers the compressed bit map image data to the main controller via the bus, and the main controller receives the compressed bit map image data from the external print controller, decompresses it, and controls the printer unit on the basis of the compression-cancelled bit map image data.

The above and other objects and features of the present invention will become apparent from the following detailed description and the appended claims with reference to the accompanying drawings.

BRIEF DESCRIPTION OF THE DRAWINGS

FIG. 10 is a diagram showing details of a construction of the second embodiment to which the invention is applied.

DETAILED DESCRIPTION OF THE PREFERRED EMBODIMENTS (First Embodiment)

Figure 1:
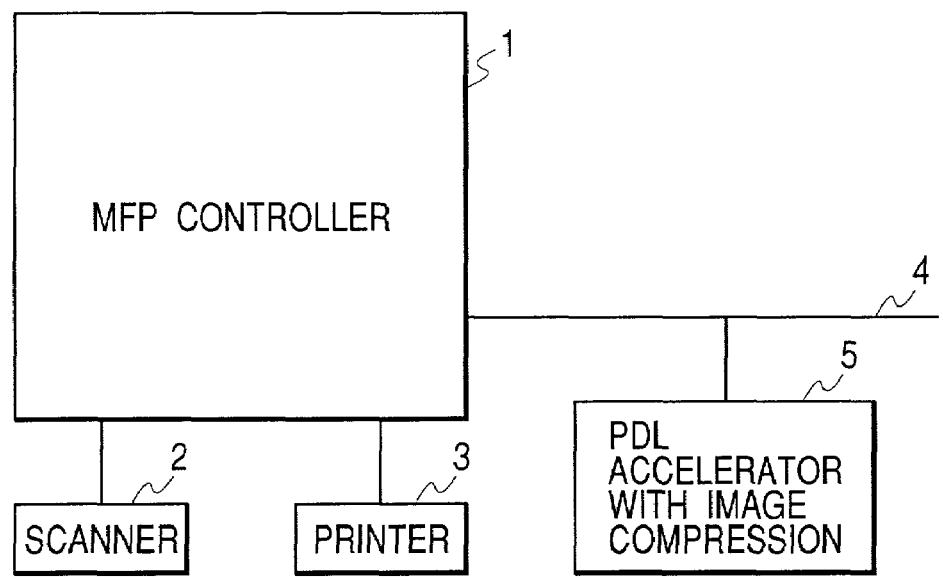
FIG. 1 is a diagram showing an embodiment to which the invention is applied and showing a construction of a case of using a PDL accelerator as an external print controller.
Figure 2:
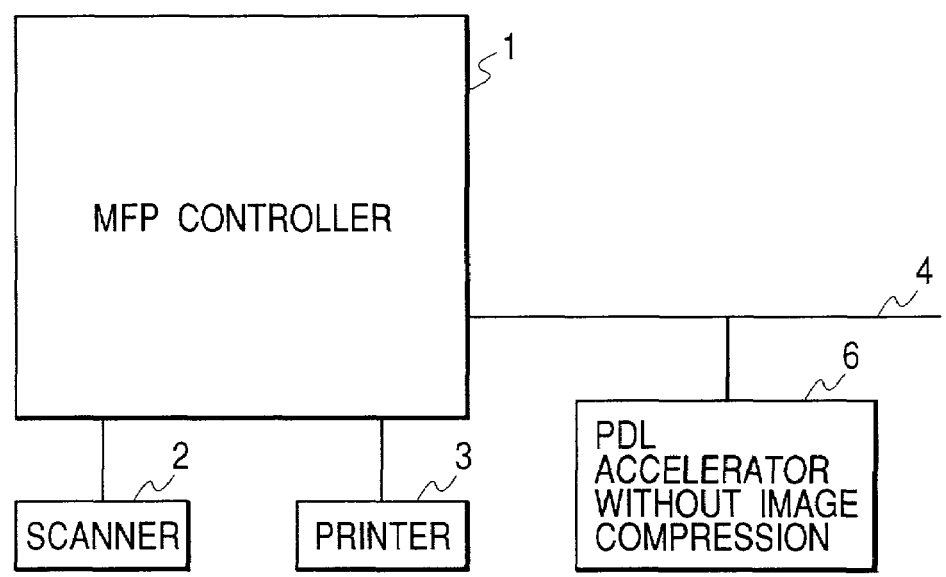
FIG. 2 is a diagram showing a construction of a conventional example.
Figure 3:
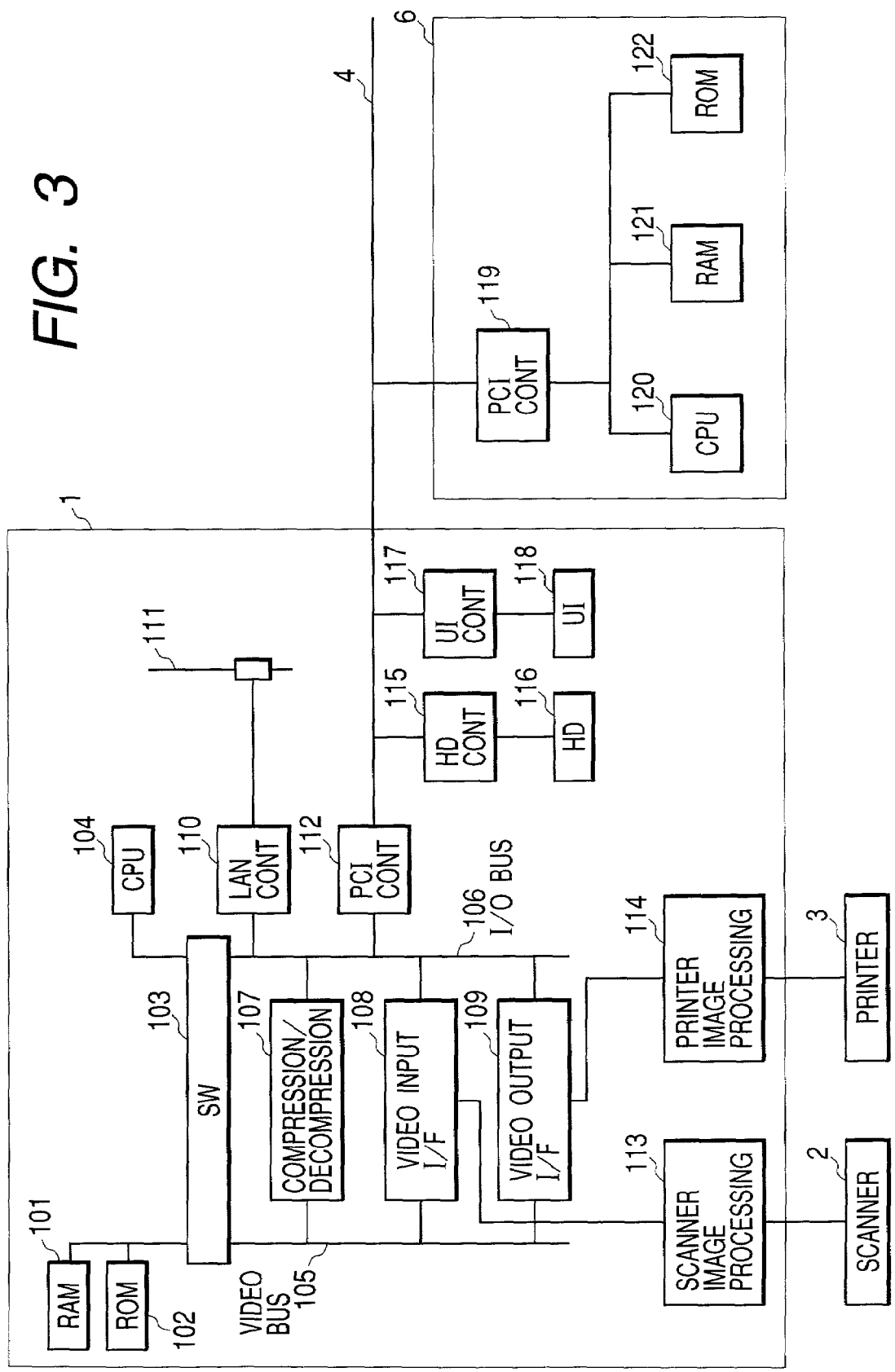
FIG. 3 is a diagram showing details of the construction of the conventional example shown in FIG. 2.

An embodiment of the invention is shown in FIG. 1. Reference numeral 1 denotes the MFP controller; 2 the scanner; and 3 the printer. An MFP having the copy function, printer function, scanner function, and the like is constructed by those component elements.

In the case where processing ability of a high-speed PDL print is lacking if only the MFP controller 1 is used, the PDL accelerator 5 is connected to the outside via the PCI bus 4, thereby coping with a high speed printer.

The PDL accelerator 5 has therein a compression unit of an image.

Figure 7:
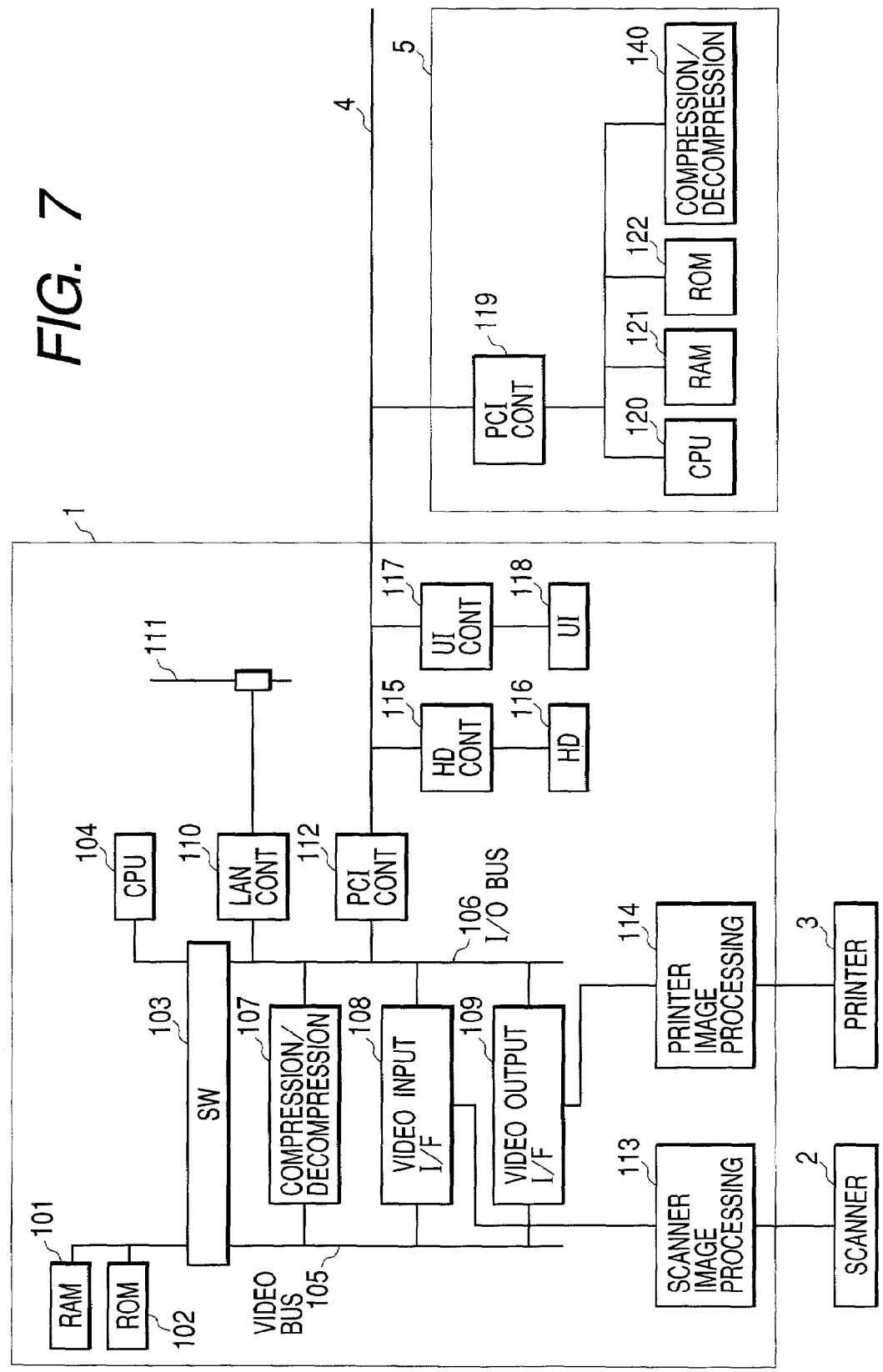
FIG. 7 is a diagram showing a detailed construction of the embodiment of the invention shown in FIG. 1.
Figure 8:
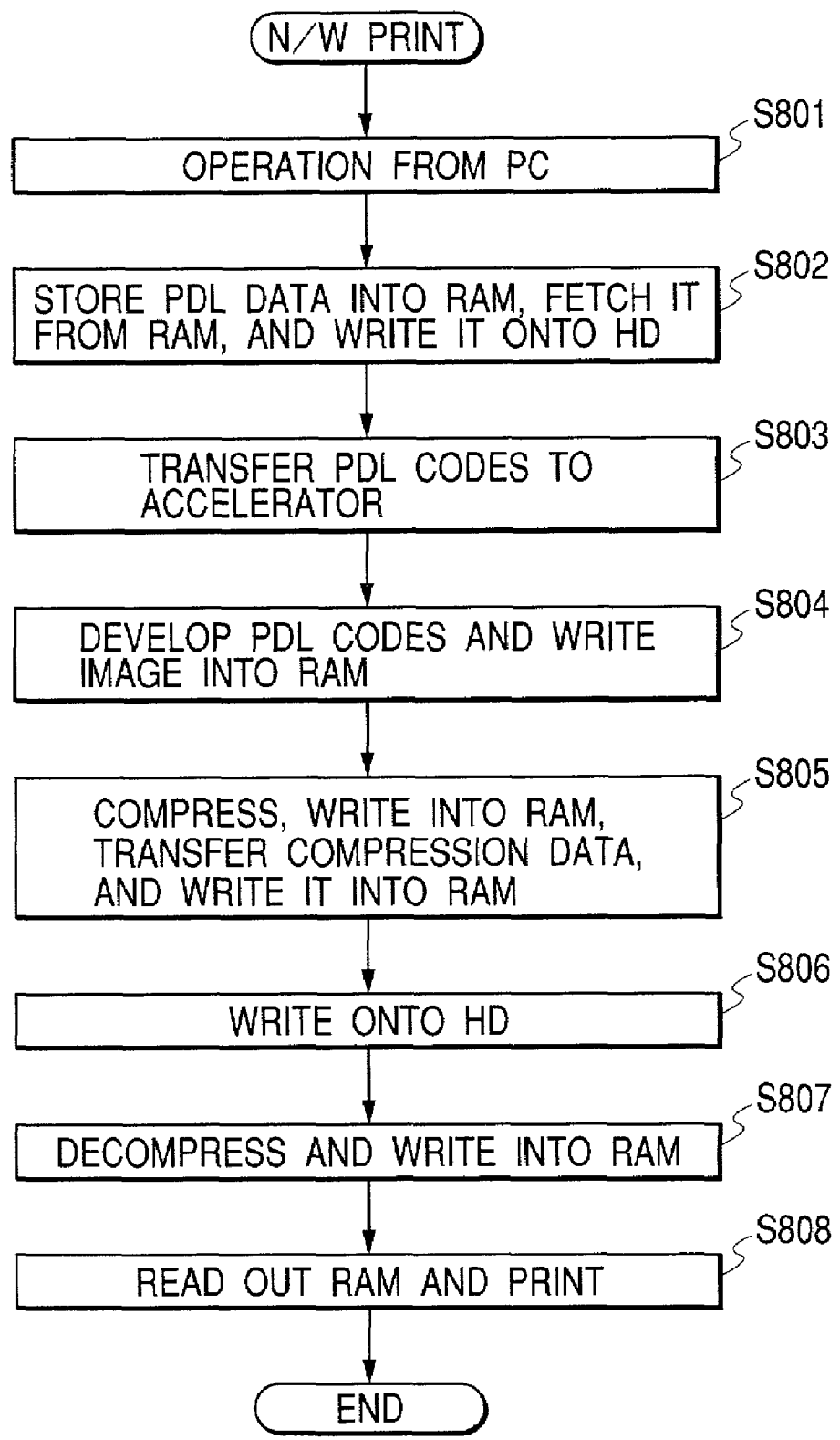
FIG. 8 is a flowchart for explaining data processes of a network PDL print in the embodiment of the invention shown in FIG. 7.
Figure 9:
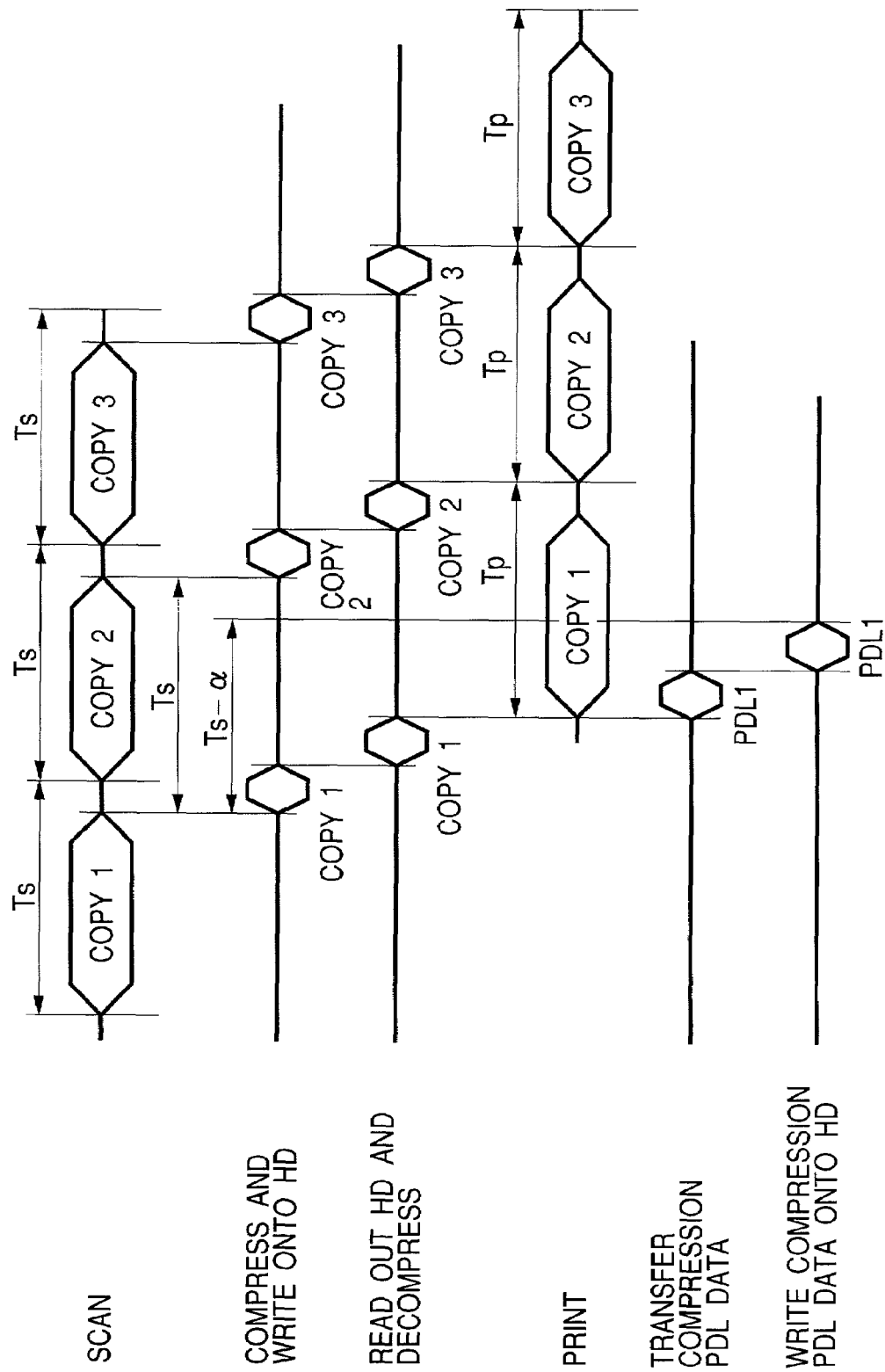
FIG. 9 is a timing chart showing the data processes in the embodiment of the invention.

FIGS. 7, 8, and 9 show details of a B/W MFP embodiment to which the invention is applied.

FIG. 7 shows a detailed construction of the B/W MFP embodiment to which the invention is applied.

Figure 4:
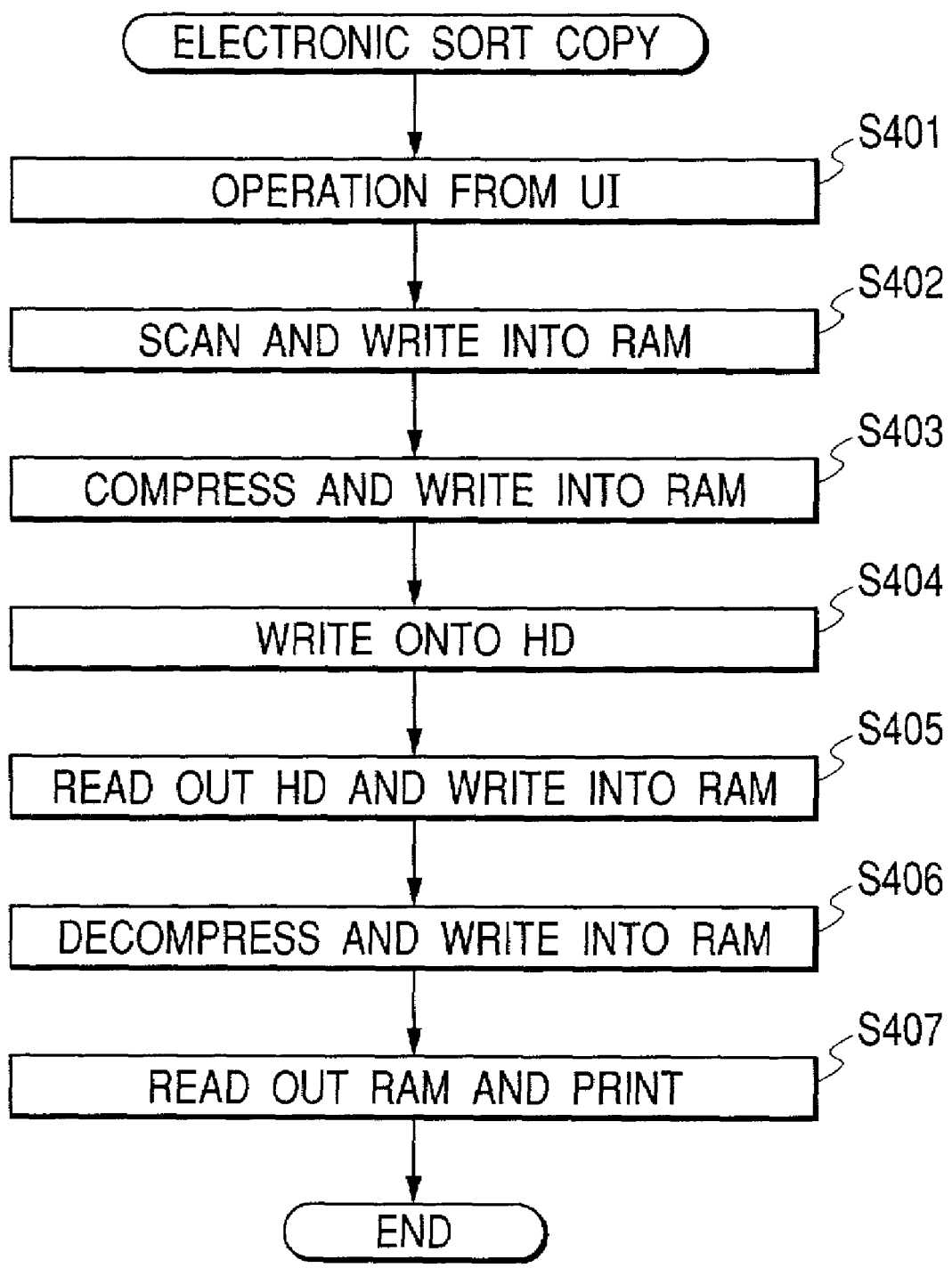
FIG. 4 is a flowchart for explaining data processes of electronic sort and copy in the conventional example shown in FIG. 3.
Figure 5:
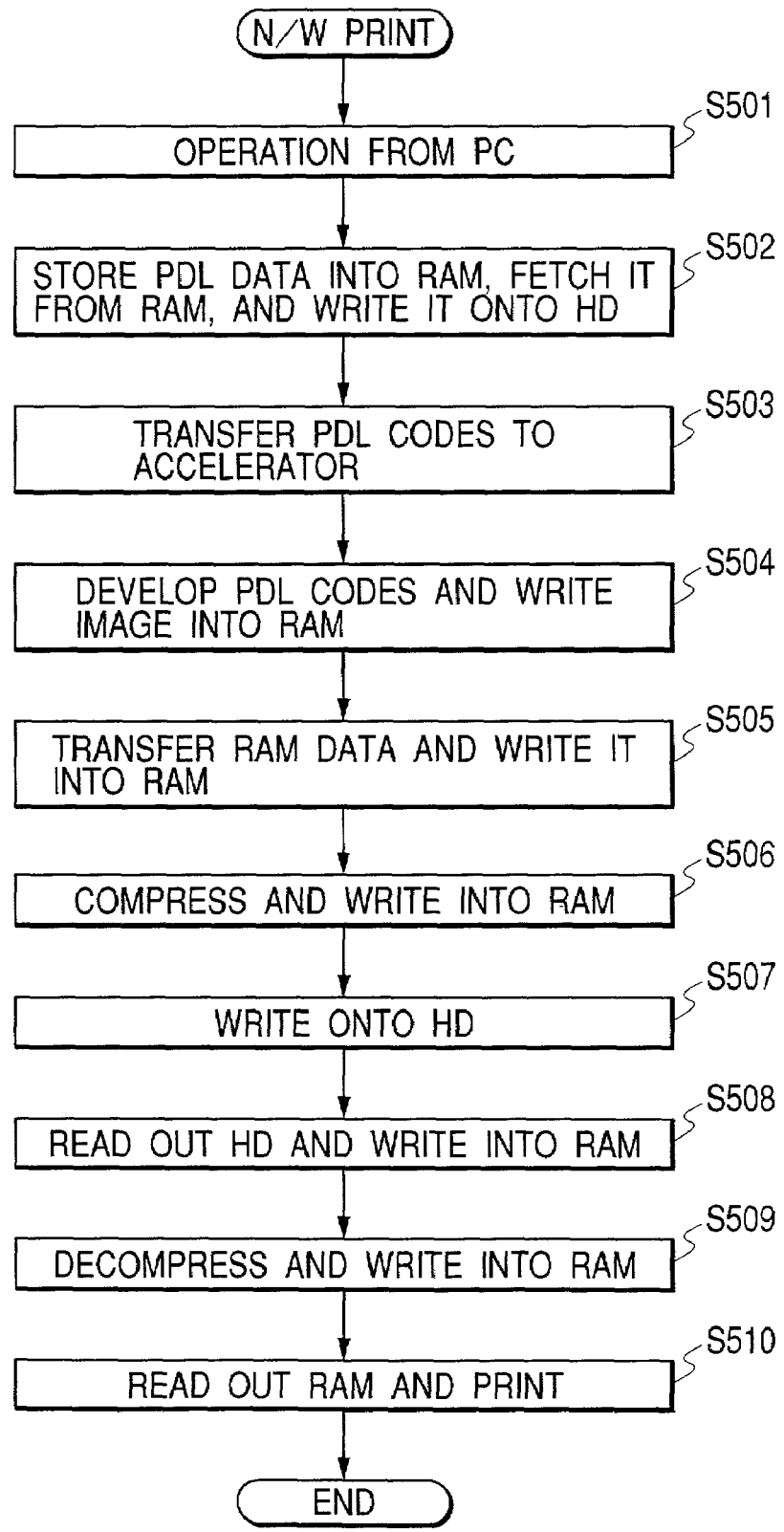
FIG. 5 is a flowchart showing processes of a network PDL print in the conventional example shown in FIG. 3.
Figure 6:
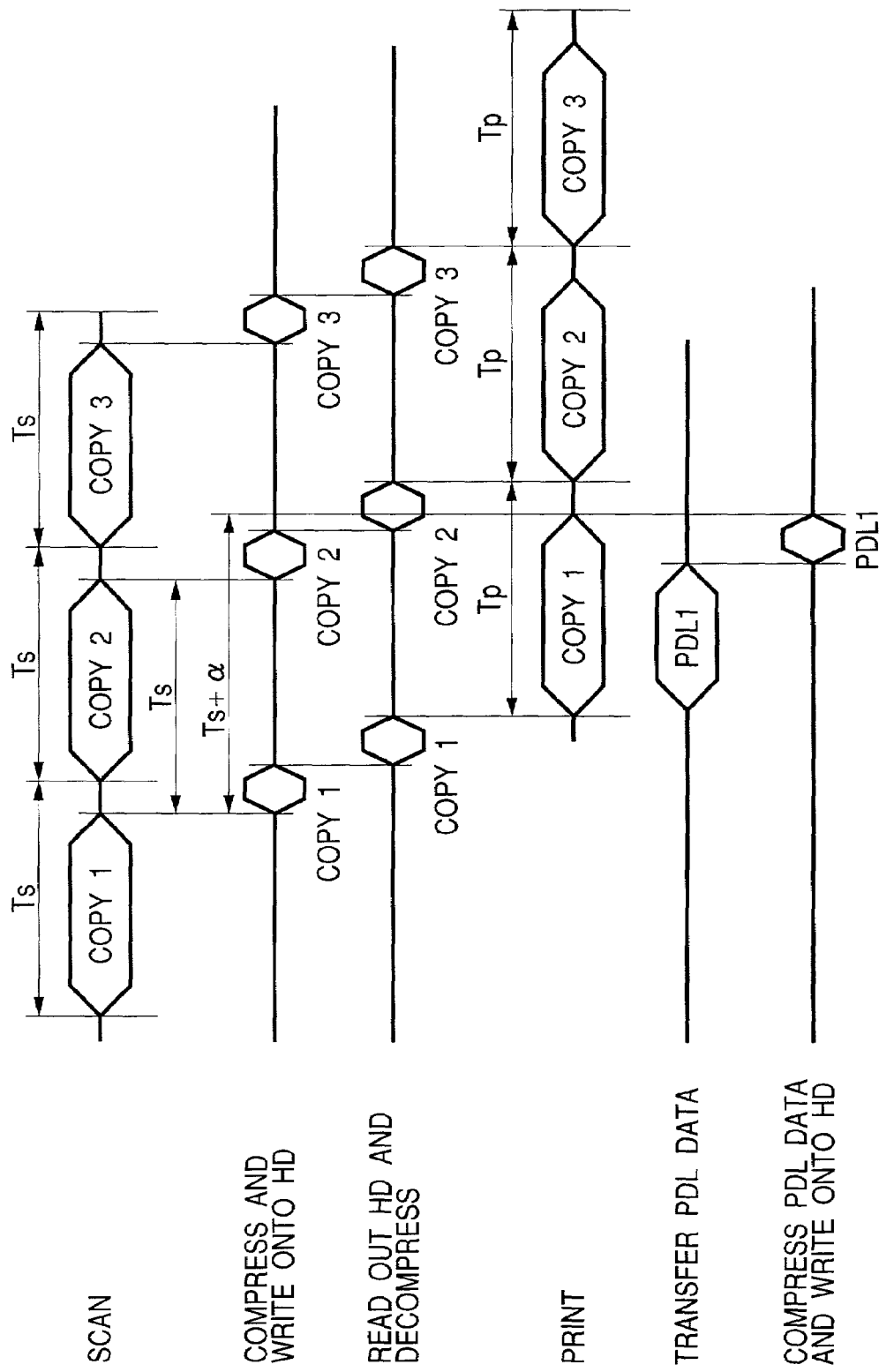
FIG. 6 is a timing chart showing the data processes in the conventional example shown in FIG. 3.

A flow for electronic sort and copy in the embodiment is similar to that shown in FIG. 4.

A flow for a network PDL print will be explained with reference to FIG. 8.

When the printing operation is executed from a PC (personal computer: not shown) connected to the network 111 (S801), the PDL print data is stored into the RAM 101 via the network 111, LANcont 110, I/O bus 106, and bus SW 103. The data in the RAM 101 is successively stored onto the HD 116 via the bus SW 103, I/O bus 106, PCIcont 112, PCI bus 4, and HDcont 115 (S802).

The PDL data stored onto the HD 116 is fetched into the RAM 101 via the HDcont 115, PCI bus 4, PCIcont 112, I/O bus 106, and bus SW 103, developed into PDL codes by a process of the CPU 104, and fetched into the RAM 101.

The PDL codes in the RAM 101 are transferred to the RAM 121 via the bus SW 103, I/O bus 106, PCIcont 112, PCI bus 4, and PCIcont 119 of the PDL accelerator 5 (S803).

In the PDL accelerator 5, the PDL codes in the RAM 121 are developed into bit map data by the CPU 120 and stored into the RAM 121 (S804).

The bit map data stored in the RAM 121 is compressed by a compression unit 140 and stored into the RAM 121.

The compressed bit map data in the RAM 121 is transferred to the RAM 101 via the PCIcont 119, PCI bus 4, PCIcont 112, I/O bus 106, and bus SW 103 (S805).

The compression bit map data stored in the RAM 101 is stored onto the HD 116 via the bus SW 103, I/O bus 106, PCIcont 112, PCI bus 4, and HDcont 115 (S806).

The compression bit map data stored onto the HD 116 is stored into the RAM 101 via the HDcont 115, PCI bus 4, PCIcont 112, I/O bus 106, and bus SW 103.

The compression bit map data which has been read out from the HD 116 and stored into the RAM 101 is decompressed by the compression/decompression unit 107 via the bus SW 103 and video bus 105 and stored into the RAM 101 via the video bus 105 and bus SW 103 (S807).

The bit map data which has been decompressed by the compression/decompression unit 107 and stored in the RAM 101 is printed by the printer 3 via the bus SW 103, I/O bus 106, video output I/F 109, and printer image processing unit 114 (S808).

Although the bit map data has conventionally been compressed and written onto the HD 116 by the MFP controller as mentioned above, in the embodiment, the bit map data is compressed by the compression unit in the external print controller and the bit map data of the data amount reduced by the compression is transferred via the PCI bus.

FIG. 9 shows a timing chart for the electronic sort and copy and the PDL print. In the diagram, "scan" shows a manner in which data of "Copy 1" and "Copy n" is fetched into the RAM 101 at repetitive timing of Ts. "Compress and write onto HD" shows a processing time which is necessary from the start of the compression of the scan data after completion of the storage of the data into the RAM 101 until the completion of the writing of the data onto the HD 116. "Read out HD and decompress" shows a time which is necessary from the start of reading of the data from the HD 116 until the compressed data is decompressed and completely developed into the RAM 101. "Print" shows a period of time during which the developed data is outputted from the RAM 101 to the printer.

"Transfer compression PDL data" shows a period of time during which the compression bit map data of the PDL is transferred from the PDL accelerator 5. "Write compression PDL data onto HD" shows a time which is necessary until the compression bit map data of the PDL is written onto the HD.

As mentioned above, if the processes of the PDL print compete during the electronic sort and copy, the total time necessary for the processes of "compress and write onto HD", "read out HD and decompress", "transfer compression PDL data", and "write compression PDL data onto HD" can be allowed to lie within the scanning period of time of one page.

In FIG. 9, such a total time is equal to (Ts−α) as compared with a scanning period Ts. This means that during the electronic sort and copy, the data obtained by developing the PDL can be compressed and stored onto the HD. This means that even if the data is data of a heavy PDL process, since the process of the PDL can be executed during the electronic sort and copy, it does not take long time to print the first page of the PDL data, the periodic print output is not interrupted halfway, and on the user's side, loss is not caused in the total time.

(Second Embodiment)

FIG. 10 shows a detailed construction of a B/W MFP and an external PDL accelerator in the second embodiment.

This construction is obtained by forming a main control portion of the MFP controller 1 by a 1-chip controller ASIC 7, and this 1-chip controller ASIC 7 is also used in common as a PDL accelerator 5.

An operation flow for the electronic sort and copy is similar to that in FIG. 7.

The flow for the network PDL print in the embodiment will now be described with reference to FIG. 8.

When the printing operation is executed from the PC (not shown) connected to the network 111 (S801), the PDL print data is stored into the RAM 101 via the network 111, LANcont 110, I/O bus 106, and bus SW 103. The data in the RAM 101 is successively stored onto the HD 116 via the bus SW 103, I/O bus 106, PCIcont 112, PCI bus 4, and HDcont 115 (S802).

The PDL data stored onto the HD 116 is fetched into the RAM 101 via the HDcont 115, PCI bus 4, PCIcont 112, I/O bus 106, and bus SW 103, developed into PDL codes by the process of the CPU 104, and fetched into the RAM 101.

The PDL codes in the RAM 101 are transferred to an RAM 123 via the bus SW 103, the I/O bus 106, the PCIcont 112, the PCI bus 4, a PCIcont 133 of the 1-chip controller ASIC 7 of the PDL accelerator 5, a video bus 127, and a bus SW 125 (S803).

In the 1-chip controller ASIC 7 of the PDL accelerator 5, the PDL codes in the RAM 123 are developed into bit map data by a CPU 126 and stored into the RAM 123 (S804).

The bit map data stored in the RAM 123 is compressed by a compression/decompression unit 129 via the bus SW 125 and video bus 127 and stored into the RAM 123 via the video bus 127 and bus SW 125. The compressed bit map data in the RAM 123 is transferred to the RAM 101 via the bus SW 125, an I/O bus 128, the PCIcont 133, PCI bus 4, PCIcont 112, I/O bus 106, and bus SW 103 (S805).

The compression bit map data stored in the RAM 101 is stored onto the HD 116 via the bus SW 103, I/O bus 106, PCIcont 112, PCI bus 4, and HDcont 115 (S806).

The compression bit map data stored onto the HD 116 is stored into the RAM 101 via the HDcont 115, PCI bus 4, PCIcont 112, I/O bus 106, and bus SW 103.

The compression bit map data which has been read out from the HD 116 and stored into the RAM 101 is decompressed by the compression/decompression unit 107 via the bus SW 103 and video bus 105 and stored into the RAM 101 via the video bus 105 and bus SW 103 (S807).

The bit map data which has been decompressed by the compression/decompression unit 107 and stored in the RAM 101 is printed by the printer 3 via the bus SW 103, I/O bus 106, video output I/F 109, and printer image processing unit 114 (S808).

Although the LANcont 110 in the MFP controller has been connected to the network in the above description, a LANcont 132 is also provided in the PDL accelerator. Therefore, by connecting the network to the LANcont 132 in the PDL accelerator, there is an advantage such that a burden of processes of the MFP controller at the time of the PDL print can be reduced.

Although the invention has been described with respect to the binary image of the MFP of B/W, a similar effect can be also obtained with respect to a multivalue image and a color MFP.

Although the PDL accelerator connected via the PCI bus has been used in the invention, it is not always necessary to limitedly use it.

Although the invention has been described with respect to the PDL accelerator as an example, even in case of another image, a similar effect can be also naturally obtained in case of effectively using the external accelerator.

As described above, according to the invention, in the PDL accelerator added to the MFP, that is, in the external print controller, the bit map data obtained by analyzing and developing the PDL data is once compressed and, subsequently, transferred via the PCI bus. Therefore, the amount of compressed bit map data can be reduced as compared with that of the bit map data which is not compressed, so that the data transfer amount is reduced and the transfer time can be shortened. Consequently, the total time which is necessary for the processes of "compress and write onto HD", "read out HD and decompress", "transfer compression PDL data", and "write compression PDL data onto HD" can be allowed to lie within the scanning period of one page.

In the case where the MFP controller is also executing the copy function, although the compression/decompression unit is used in the process of the copy function, since this process does not compete with the compressing/decompressing process, the compressing process of the PDL bit map data can be executed independent of the compressing process in the copying operation. Even in case of the data of the heavy PDL, the PDL can be processed during the copying process without deteriorating the copying performance. Therefore, on the user's side, the deterioration of the PDL performance can be hardly confirmed.

By constructing the external print controller in a manner similar to the main controller, resources of the hardware and software in the main controller are effectively used and the external print controller can be constructed and made operative.

What is claimed is:

1. A controller which can be connected to a scanner, a printer, and a network, comprising:
   a first compressing circuit for compressing a first bit map image which is inputted from said scanner;
   a converting unit for converting PDL codes received from said network into a second bit map image;
   a second compressing circuit for compressing the second bit map image which is outputted from said converting unit;
   first access means for writing the first bit map image compressed by said first compressing circuit into a storage device and reading out the compressed first bit map image from said storage device;
   second access means for writing the second bit map image compressed by said second compressing circuit into said storage device and reading out the compressed second bit map image from said storage device so as to supply said second bit map image to a decompressing circuit; and
   control means for interruption-executing the writing process to said storage device by said second access means during the access to said storage device by said first access means.

2. A controller according to claim 1, wherein after the second bit map image of an Nth page was read out from said storage device, before the writing of the second bit map image of an (N+1)th page is started, said control means interruption-executes the writing process to said storage device by said second access means.

3. An image processing method in a controller which can be connected to a scanner, a printer, and a network, comprising:
   a first compressing step of compressing a first bit map image which is inputted from said scanner by a first compressing circuit;
   a converting step of converting PDL codes received from said network into a second bit map image by a converting unit;
   a second compressing step of compressing the second bit map image which is outputted by said converting unit by a second compressing circuit;
   a first access step of writing the first bit map image compressed by said first compressing circuit into a storage device and reading out the compressed first bit map image from said storage device;
   a second access step of writing the second bit map image compressed by said second compressing circuit into said storage device and reading out the compressed second bit map image from said storage device so as to supply said second bit map image to a decompressing circuit; and
   a control step of interruption-executing the writing process to said storage device by said second access step during the access to said storage device by said first access step.

4. A method according to claim 3, wherein in said control step, after the second bit map image of an Nth page was read out from said storage device, before the writing of the second bit map image of an (N+1)th page is started, the writing process to said storage device by said second access step is interruption-executed.

* * * * *

UNITED STATES PATENT AND TRADEMARK OFFICE
CERTIFICATE OF CORRECTION

PATENT NO.       : 7,167,263 B2
APPLICATION NO.  : 10/176057
DATED            : January 23, 2007
INVENTOR(S)      : Takayama et al.

It is certified that error appears in the above-identified patent and that said Letters Patent is hereby corrected as shown below:

COVER SHEET:
(56) References Cited, Insert
-- FOREIGN PATENT DOCUMENTS

JP           11-219273          8/1999 --.

Signed and Sealed this

Thirtieth Day of October, 2007

JON W. DUDAS
*Director of the United States Patent and Trademark Office*